Figure 13:
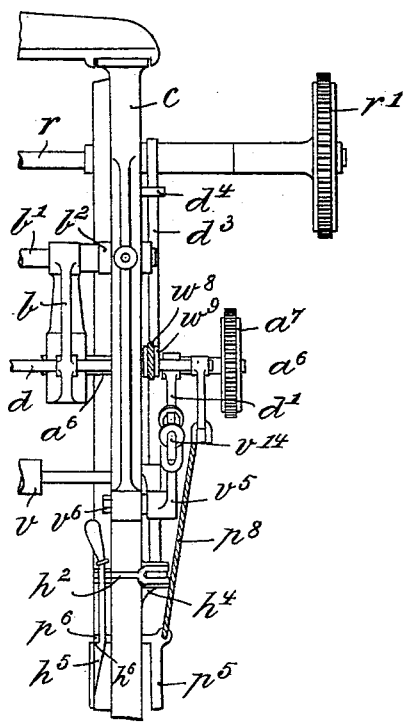

No. 618,269. Patented Jan. 24, 1899.
J. HALL.
MACHINE FOR TREATING HIDES, SKINS, OR LEATHER.
(Application filed Sept. 9, 1898.)
(No Model.) 6 Sheets—Sheet 1.
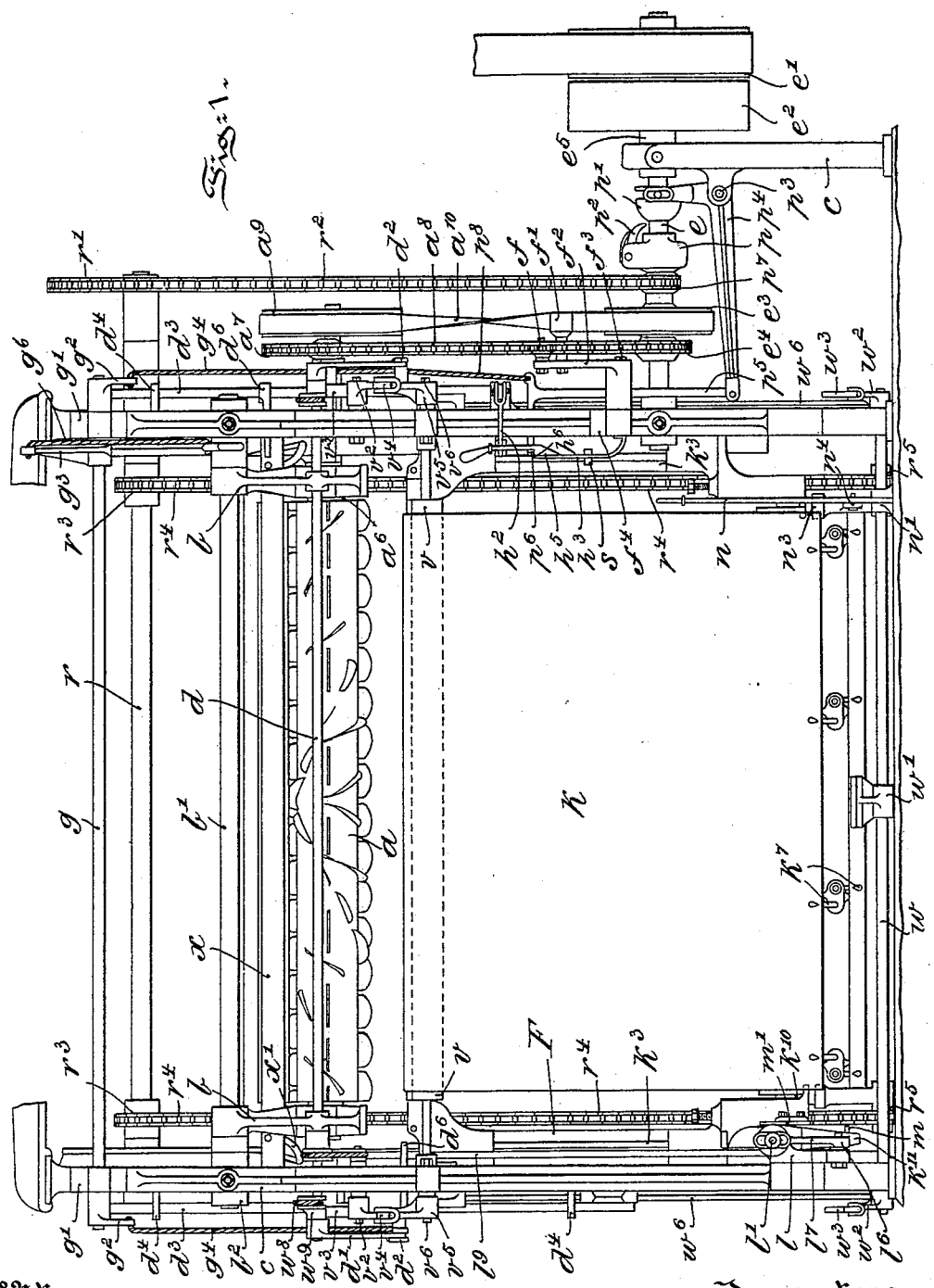

No. 618,269. Patented Jan. 24, 1899.
J. HALL.
MACHINE FOR TREATING HIDES, SKINS, OR LEATHER.
(Application filed Sept. 9, 1898.)
(No Model.) 6 Sheets—Sheet 2.
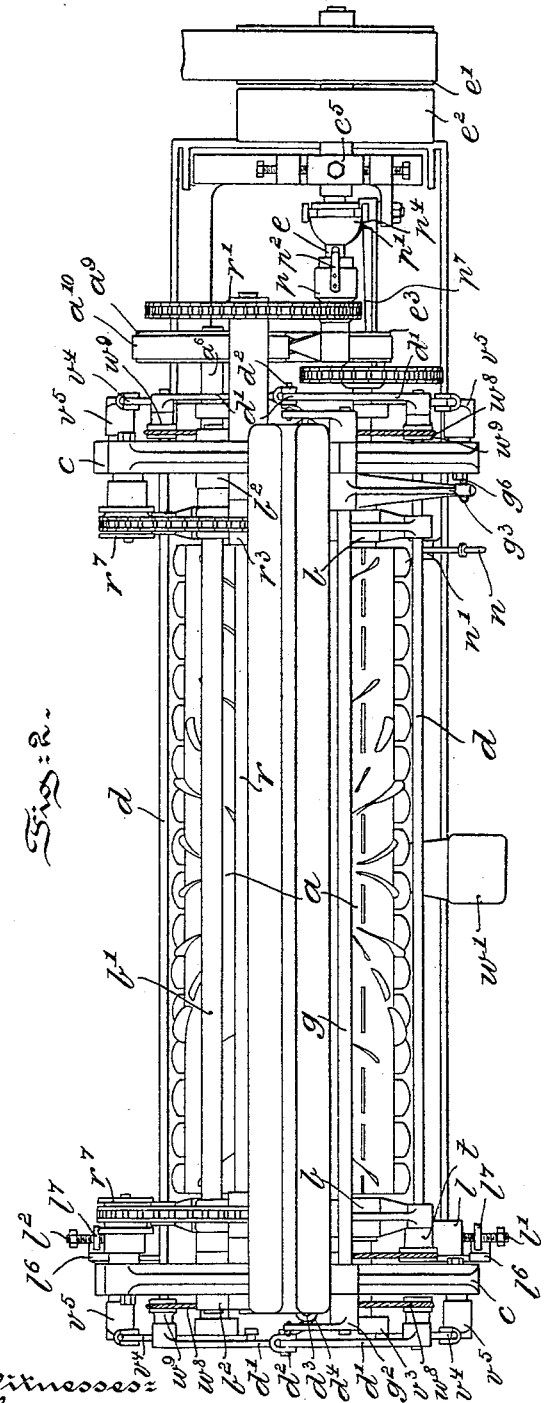
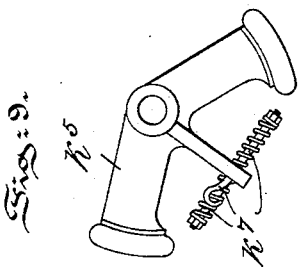
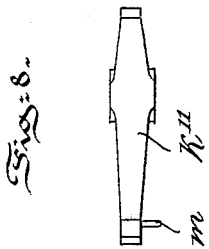
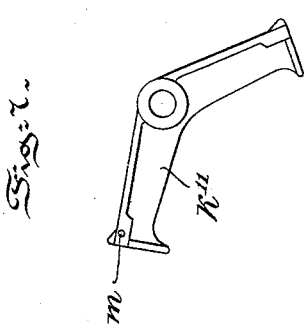

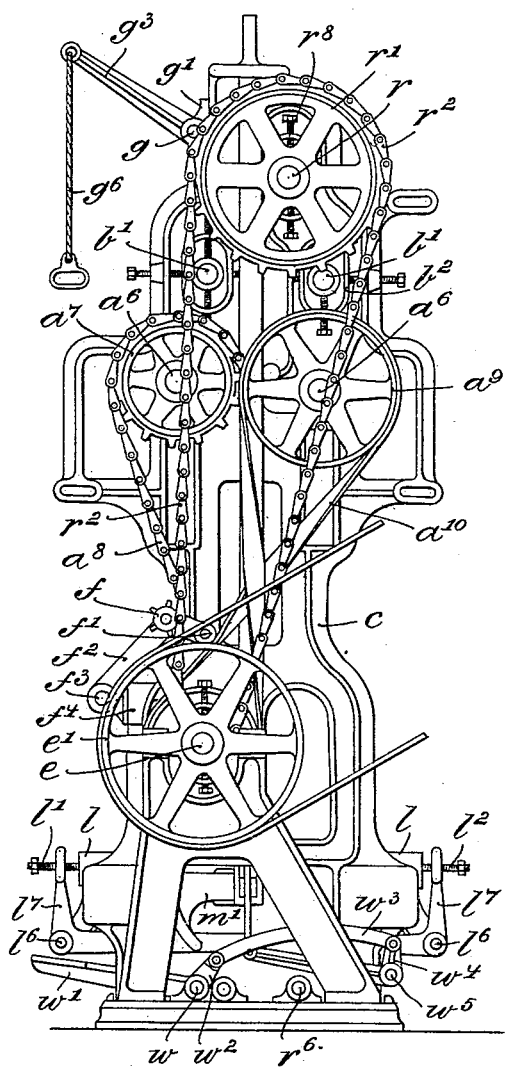

No. 618,269. Patented Jan. 24, 1899.
J. HALL.
MACHINE FOR TREATING HIDES, SKINS, OR LEATHER.
(Application filed Sept. 9, 1898.)
(No Model.) 6 Sheets—Sheet 4.
Fig. 5.
Fig. 6.
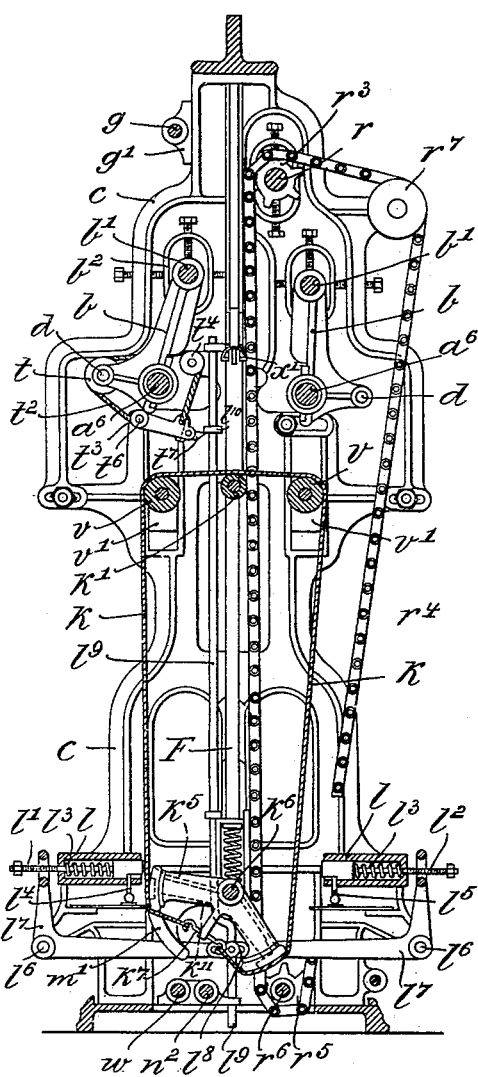
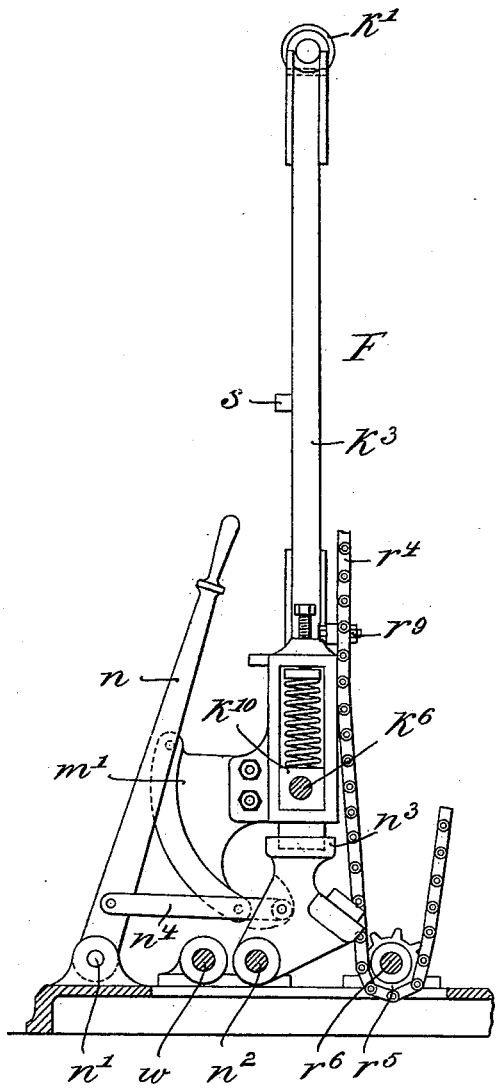
Witnesses:
Thomas M. Smith.
Richard C. Maxwell
Inventor:
Joseph Hall
By J. Walter Douglas
Attorney.

No. 618,269. Patented Jan. 24, 1899.
J. HALL.
MACHINE FOR TREATING HIDES, SKINS, OR LEATHER.
(Application filed Sept. 9, 1898.)
(No Model.) 6 Sheets—Sheet 5.
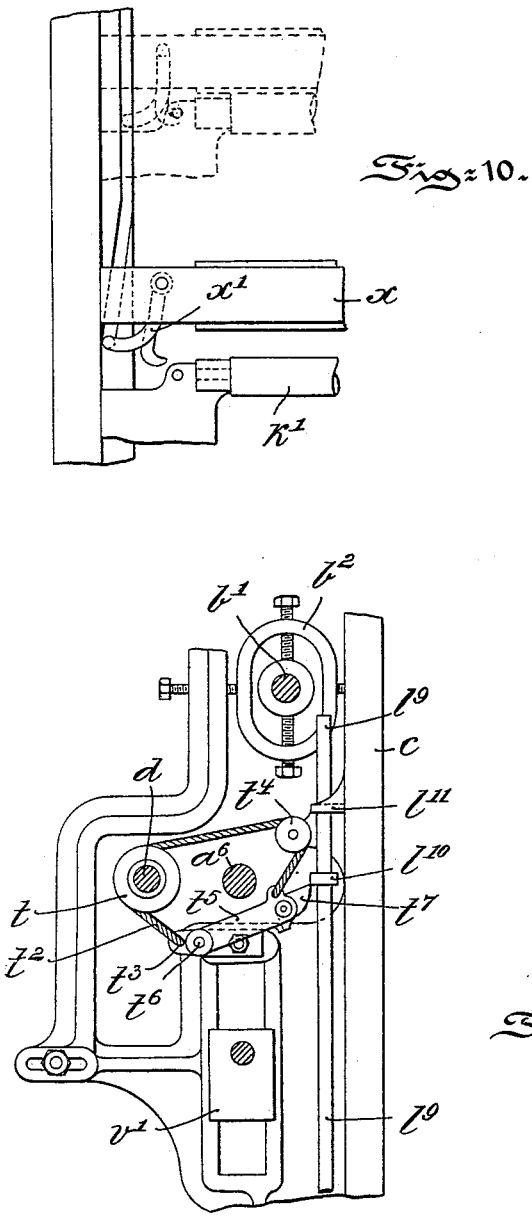
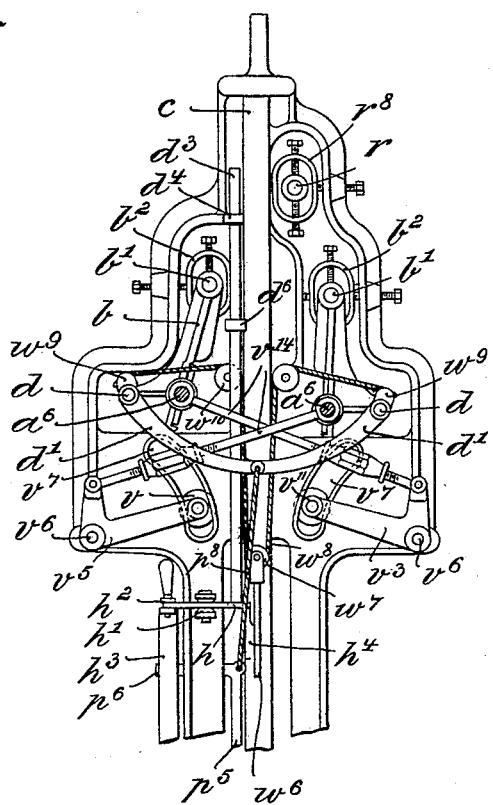
Witnesses:
Thomas M. Smith.
Richard C. Maxwell.
Inventor:
Joseph Hall,
By J. Walter Douglass
Attorney.

No. 618,269. Patented Jan. 24, 1899.
J. HALL.
MACHINE FOR TREATING HIDES, SKINS, OR LEATHER.
(Application filed Sept. 9, 1898.)
(No Model.) 6 Sheets—Sheet 6.

UNITED STATES PATENT OFFICE.

JOSEPH HALL, OF LEEDS, ENGLAND.

MACHINE FOR TREATING HIDES, SKINS, OR LEATHER.

SPECIFICATION forming part of Letters Patent No. 618,269, dated January 24, 1899.

Application filed September 9, 1898. Serial No. 690,556. (No model.)

*To all whom it may concern:*

Be it known that I, JOSEPH HALL, a subject of the Queen of Great Britain, residing at Leeds, in the county of York, England, have invented certain new and useful Improvements in Machines for Treating Hides, Skins, or Leather, of which the following is a specification.

My invention has relation to a machine for treating hides, skins, or leather of the type illustrated in United States Letters Patent No. 599,331, granted to me under date of February 22, 1898; and in such connection it relates to the construction and arrangement of such a machine.

My present invention is an improvement upon the machine of my prior patent above set forth, said improvements consisting particularly in the construction and arrangement of the apron upon which the work is supported, which apron is used in connection with a vertically-movable table and two working rolls or cylinders, between which the table is adapted to move.

My invention, stated in general terms, consists of a machine of the character described constructed and arranged in substantially the manner hereinafter explained and claimed.

The nature and scope of my present invention will be more fully understood from the following description, taken in connection with the accompanying drawings, forming part thereof, in which—

Figure 1 is a front elevational view, partly broken away, of a machine embodying main features of my invention. Fig. 2 is a top or plan view thereof. Fig. 3 is an end elevation of the machine, certain parts being removed. Fig. 4 is a view similar to Fig. 3, but with the driving mechanism removed. Fig. 5 is a vertical sectional view of the machine. Fig. 6 is an end elevational view of mechanism for stopping the table in its downward movement to prevent shifting of the apron. Figs. 7, 8, and 9 are detail views, enlarged, of the arms forming a part of the mechanism for shifting the apron on the table. Fig. 10 is a detail view illustrating in enlarged front elevation the nipping-bar and accessories. Fig. 11 is a detail view illustrating in enlarged end elevation the means for withdrawing the spring-bolts controlling the shifting mechanism for the apron. Fig. 12 is a detail view illustrating in enlarged end elevation a modified form of means for operating the rollers which draw the apron taut prior to the presentation of the work on the apron to the action of the working rolls or cylinders, and Fig. 13 is a front elevational view of Fig. 12.

Referring to the drawings, the working rolls or cylinders $a\ a$ are arranged side by side on shafts $a^6$, having bearings in the swinging arms or levers $b$. The arms or levers $b$ have a fulcrum upon the shaft or spindle $b'$, which has its bearings in the framework $c$ of the machine. The levers $b$ also carry the shafts $d$. The working rolls $a\ a$ are driven in opposite directions from a counter-shaft $e$, provided with fast and loose pulleys $e'$ and $e^2$ and with a pulley $e^3$ and sprocket-wheel $e^4$. The shaft $e$ rests in adjustable bearings $e^5$ in the framework $e$. The shaft of one roller $a$ is provided with a sprocket-wheel $a^7$, driven by an endless chain $a^8$ from sprocket-wheel $e^4$, while the shaft of the other roller has a pulley $a^9$, driven by a crossed belt $a^{10}$ from pulley $e^3$. To maintain the chain $a^8$ and belt $a^{10}$ sufficiently taut, a sprocket-wheel $f$ and a pulley $f'$ are mounted in a lever $f^2$, having its fulcrum $f^3$ in a bracket $f^4$ on the framework of the machine, in such a manner that the sprocket, pulley, and lever press with their weight against the chain $a^8$ and belt $a^{10}$, as illustrated in Fig. 3.

The cylinders or rolls $a\ a$ are separated from each other in the following preferred manner: On each shaft $d$ is secured a lever $d'$, each lever $d'$ being pivoted, as at $d^2$, to a vertical rod $d^3$, guided in the bearings $d^4$ and carrying the fingers $d^6$. The framework $c$ is provided at or near is upper end with a bracket $g'$, in which is carried a shaft $g$, which shaft is provided with two levers $g^2$ and a hand-lever $g^3$. The levers $g^2$ are each connected by a chain or cord $g^4$ to the pivot $d^2$ of each lever $d'$, so that when the chains or cords $g^4$ are pulled in one direction the rod $d^3$ is lifted and the rolls or cylinders $a\ a$ are thereby caused to separate. After the rolls $a\ a$ have been thus separated the lever $h$, pivoted, as at $h'$, to the framework $c$ and connected by the forked lever $h^2$ with a spring-handle $h^3$, is caused by said spring-handle to swing under the end of that rod $d^3$ which is situated at the driving end of the machine. In this position the end of the lever $h$ rests on a lug $h^4$, and upon the release of the cord $g^6$ the rod $d^3$ remains supported upon the lever $h$ and the rollers $a\ a$ are held thereby in separated position and are only allowed to approach each other when the spring-handle $h^3$ is pushed to one side to move the lever $h$ from under the rod $d^3$.

Between the rolls $a\ a$ is adapted to slide a vertically-movable table F, which is driven from the counter-shaft $e$ in preferably the following manner: On the counter-shaft $e$ is located a loose sprocket-wheel $p^7$, which is adapted to be secured to the shaft $e$ by means of a clutch-box $p$, rotating with the shaft when a boss $p'$ is forced into contact with the spring-finger $p^2$. The boss $p'$ is operated by a bell-crank lever $p^4$, pivoted, as at $p^3$, to the frame $c$, and also pivoted at its other end to a vertically-arranged rod $p^5$, carrying a horizontal bar $p^6$, maintained in its horizontal position by a catch $h^6$ on the spring-handle $h^3$. The bar $p^6$ is connected by a cord or chain $p^8$ with the pivotal connection $d^2$ of the levers $d$, operating the cylinders $a\ a$. The sprocket-wheel $p^7$ on the shaft $e$ is connected by a cord or chain $r^2$ with a sprocket-wheel $r'$, secured to a shaft $r$, having adjustable bearings $r^8$ in the frame $c$ of the machine. On the shaft $r$ are located the two sprocket-wheels $r^3$, which are connected by chains $r^4$, running over the guide-pulleys $r^7$, with the sprockets $r^5$, fixed on shaft $r^6$ at the base of the machine. The chains $r^4$ are attached, as at $r^9$, to the slides $k^3$, forming the sides of the table F. When the spring-handle $h^3$ is operated to release the lever $h$ from rod $d^3$ and to thereby permit the rolls $a\ a$ to approach each other, the horizontal bar $p^6$ will also be released from the catch $h^5$ and permit the rod $p^5$ to drop. The lever $p^4$ is thereby operated to force the boss $p'$ into contact with the finger $p^2$, and hence the wheel $p^7$ is locked to the shaft $e$ and the table is raised. When the table F is elevated to its fullest extent, the stops $s$, which are carried by the slides $k^3$ of the table, meet the fingers $d^6$ of the rod $d^3$, thereby elevating said rod $d^3$ and forcing the cylinders $a\ a$ apart. The chain $p^8$ now lifts the bar $p^6$ and rod $p^5$, and thus throws the boss $p'$ partially out of contact with the clutch $p$, and motion to the table is thereby stopped. The chain $g^6$ is now pulled to lift the rod $d^3$ higher, so that the handle $h^3$ may spring back to carry lever $h$ under rod $d^3$ and to lift the bar $p^6$ again onto the catch $h^5$. The table is now permitted to descend by gravity, its downward movement being controlled, if desired, by any suitable brake (not shown) until it rests at the bottom of the machine upon buffers or cushions $n^3$, as illustrated in Fig. 6. The immediate support for the work is an apron $k$, which passes over and is shifted on a roller $k'$ at the upper edge of the table F. The ends of this apron $k$ are secured by hooks $k^7$ or other means to an oscillating frame $k^5$, fixed to a rocking shaft $k^6$. This frame $k^5$ and the means for securing the apron thereto are clearly illustrated in Figs. 5 and 9. The rock-shaft $k^6$ is carried in spring-bearings $k^{10}$ in the lower part of the slides $k^3$ of the table F, and to one end of this shaft $k^6$ is secured a rocking lever $k^{11}$ of preferably the form illustrated in Fig. 7. The framework $c$, adjacent to the lever $k^{11}$, is provided with brackets $l$, in which work the spring-bolts $l'$ and $l^2$, the springs $l^3$ whereof serve to normally push said bolts into the path of the said rock-lever $k^{11}$. Below the bolts $l'$ and $l^2$ are located the spring-catches $l^4$ and $l^5$, which catches are adapted to engage and hold the bolts $l'$ and $l^2$ when the same are retracted. As the table F descends an arm of lever $k^{11}$ touches one or the other of the catches $l^4$ and $l^5$ and releases the same, so as to permit a corresponding bolt $l'$ or $l^2$ to shoot out under the influence of its spring until it extends above the lever $k^{11}$ and in alinement therewith. When the table next ascends, the lever $k^{11}$ is caused to oscillate or rock, and thus through levers $k^5$, will shift the apron upon the roller $k'$, so as to bring that part of the work previously unoperated upon into a position so that the cylinders $a$ can act upon it. After the lever $k^{11}$ has passed a bolt $l'$ or $l^2$ and has been acted upon it is prevented from further movement by a pin $m$, engaging a spring-quadrant $m'$ on the slide $k^3$ of the table. Upon the next descent of the table the lever $k^{11}$ releases the other catch to project an opposite bolt into the path of said lever $k^{11}$, whereby upon the ascent of the table the apron is shifted in an opposite direction. The bolts are withdrawn automatically by the following preferred means:

Referring to Figs. 5 and 11, on the shaft $d$ is a pulley $t$, over which runs the cord $t^2$, fixed at one end $t^3$ to the frame $c$ and passing over another pulley $t^4$, mounted on said frame, the other end of said cord being secured to a lever $t^5$, pivoted, as at $t^6$, and having a projecting nose or latch $t^7$. On the brackets $l$ are pivoted, as at $l^6$, two bell-crank levers $l^7$, connected by a pin and slot, as at $l^8$, to a vertical rod $l^9$, having a collar $l^{10}$ and guided in a bearing $l^{11}$. When now in the operation of the machine the cord $g^6$ is pulled, the shaft $d$, carrying pulley $t$, is swung outward and the cord $t^2$ lifts the lever $t^5$ and the rod $l^9$. The levers $l^7$ are thus moved and draw back that bolt $l'$ or $l^2$ which is projecting. When in the descent of the table the cylinders $a$ swing apart, the lever $t^5$ will clear the collar $l^{10}$ and permit the rod $l^9$ and levers $l^7$ to drop, thus leaving the bolts $l'$ and $l^2$ free to shoot forward upon the further descent of the table. When during the ascent of the table the cylinders $a$ are brought together, the lever $t^5$ drops and its latch $t^7$ again comes under the collar $l^{10}$, so as to be ready to lift the rod $l^9$ upon the further ascent of said table.

When it is desired not to shift the apron on the table, the lever $k^{11}$ is prevented from touching the spring-catches by an arrangement shown in Figs. 1 and 6, in which a hand-lever $n$ is pivoted, as at $n'$, in the bed of the machine and is connected by a link $n^4$ to a shaft $n^2$, rocking in the machine-bed and carrying the buffers $n^3$. The buffers $n^3$ have two surfaces of varying heights, so that when the hand-lever is pushed in one direction the higher part of the buffer is interposed below the bottom of the table F, and thus prevents the descent of said table sufficiently to keep the lever $k^{11}$ from acting on the catches $l^4$ or $l^5$. The hand-lever when pushed in the opposite direction brings the lower part of the buffer under the table to brake the descent of said table, but not to prevent the lever $k^{11}$ from operating the bolts $l'$ or $l^2$.

In Figs. 1 and 10 are illustrated the nipping-bar $x$ and its accessories, designed to clamp the work down upon the top edge of the table when the table is elevated to present the work to the cylinders. The construction and operation of this bar $x$ and its catches $x'$ are fully described in my previous patent, No. 599,331, and further description in the present application is not deemed necessary.

The cylinders $a$ $a$ may be brought together or separated by a treadle mechanism, as well as by means of the cord $g^6$, as heretofore described. This treadle mechanism is shown in Figs. 3 and 4, and consists of a shaft $w$, rocking in the frame $c$ of the machine, to which shaft a foot-lever $w'$ is secured. On the ends of the shaft $w$ are secured the two crank-arms $w^2$, connected by links $w^3$ to bell-crank levers $w^4$, which are pivoted, as at $w^5$, in the frame $c$. These bell-crank levers $w^4$ are also connected to adjustable rods $w^6$, carrying the pulleys $w^7$, under each of which passes a cord or chain $w^8$. These cords or chains also pass over the pulleys $w^{10}$, pivoted in the frame $c$, and have their ends secured to blocks $w^9$, secured to the shafts $d$. When the foot-lever $w'$ is depressed, the levers $w^2$ and $w^4$, rod $w^6$, and chain $w^8$ act to bring the rollers $a$ together.

So far as described the machine of the present application is essentially like that described in my prior patent, with such changes or modifications as can be readily ascertained by a comparison of the present application with said patent. The principal features of the present application do not, however, reside in these modifications, but in the mechanisms, to be hereinafter described.

Heretofore in machines of the class to which this invention relates the work on the vertically-movable table was presented to the cylinders in such a manner that only a small portion of the peripheries of the cylinders came into operative contact with said work. One of the objects of my present invention is to so present the work to the cylinders that a greater surface of said cylinders will act upon the work than has heretofore been deemed possible. To accomplish this object, the following instrumentalities are preferably used:

Referring to Figs. 4 and 5, the upper portion of the apron $k$ passes over two side rollers $v$ or their equivalents, which rollers $v$ slide in guides $v'$ in the frame $c$ of the machine. These rollers $v$ are adapted to be raised beneath the apron $k$ when the cylinders $a$ are brought together and to be lowered when the cylinders are separated. This movement of the rollers $v$ is accomplished as follows: On the frame $c$ are pivoted, as at $v^2$, the four levers $v^3$, having slotted upper ends in which the ends of the shafts $a^6$ of the cylinders $a$ rotate. The other ends of these levers $v^3$ are connected by adjustable links $v^4$ to one end of the bell-crank levers $v^5$, pivoted, as at $v^6$, to the frame $c$. The other ends of these bell-crank levers $v^5$ are slotted and engage with studs $v^8$ on the boxes $v^9$, sliding in the guides $v'$ and carrying the rollers $v$. When now the cylinders $a$ move toward each other, the levers $v^5$ are operated to raise the rollers $v$ beneath the apron and spread said apron so that it will embrace more than one-third of the periphery of each of the cylinders $a$. When the cylinders separate, the rollers $v$ drop to their normal position.

In Figs. 12 and 13 a modified form of mechanism for elevating and depressing the rollers $v$ is illustrated, which mechanism is as follows: The rollers $v$ are carried in the ends of the bell-crank levers $v^5$, pivoted, as at $v^6$, in the frame $c$ and having bearing-blocks $v^{11}$ sliding in quadrant slots $v^7$. On each shaft $a^6$ of cylinders $a$ is mounted an adjustable link $v^{14}$, which is connected to the shorter arm of a bell-crank lever $v^5$ on the opposite side of the machine. From the above description it will be understood that as the table ascends and the working rolls are brought into operative position the rollers $v$ draw the apron away from the table, so as to surround at least one-third of the periphery of each working roll with the apron and the work laid thereon. By this means the efficiency of each roll is greatly increased and the work is acted upon with more speed and better results than heretofore.

Having thus described the nature and objects of my invention, what I claim as new, and desire to secure by Letters Patent, is—

1. In a machine of the character described, two working rolls or cylinders, a vertically-arranged table adapted to be raised and lowered between said rolls, an apron passed around said table and adapted to receive the work, and mechanism for spreading said apron away from the table during the upward movement of said table, whereby a greater portion of said apron and the work thereon may be presented to the working rolls, substantially as and for the purposes described.

2. In a machine of the character described, two working rolls or cylinders, a vertically-arranged table adapted to be raised and lowered between said rolls, an apron adapted to receive the work and passed around said table, means for shifting said apron on said table, and mechanism for spreading the apron away from the sides of the table during the upward movement of said table, substantially as and for the purposes described.

3. In a machine of the character described, two working rolls or cylinders, a vertically-arranged table adapted to be raised and lowered between said rolls, an apron adapted to receive the work and passing around said table, means for moving said rolls toward or away from each other, and mechanism, controlled by said means, for spreading said apron during the upward movement of the table and the inward movement of the rolls, substantially as and for the purposes described.

4. In a machine of the character described, a vertically-arranged table, an apron passing around said table two rollers arranged between the sides of the table and the apron and means for elevating said rollers to spread the apron away from the sides of said table, substantially as and for the purposes described.

In testimony whereof I have hereunto set my signature in the presence of two subscribing witnesses.

JOSEPH HALL.

Witnesses:
 ANNA HEINS,
 ETHEL ANNIE HALL.